United States Patent [19]

Staubli

[11] Patent Number: 5,078,294

[45] Date of Patent: Jan. 7, 1992

[54] METHOD FOR TIGHT SEALING AND HOLE ARRANGEMENT

[75] Inventor: Willi Staubli, Klingnau, Switzerland

[73] Assignee: Koenig Berbindungstechnik AG, Dietikon, Switzerland

[21] Appl. No.: 409,623

[22] Filed: Sep. 15, 1989

[30] Foreign Application Priority Data

Sep. 16, 1988 [DE] Fed. Rep. of Germany ....... 3831523

[51] Int. Cl.⁵ .............................................. B65D 39/12
[52] U.S. Cl. .................... 220/233; 220/234; 220/235; 220/237; 29/522.1
[58] Field of Search .............. 220/233, 234, 235, 236, 220/237; 29/522.1

[56] References Cited

U.S. PATENT DOCUMENTS

| | | | |
|---|---|---|---|
| 2,292,467 | 8/1942 | Norsell | 220/233 |
| 2,348,589 | 5/1944 | Auten | 220/235 |
| 2,424,449 | 7/1947 | Gasche | 220/237 |
| 2,466,546 | 4/1949 | Huelster | 29/522.1 |
| 3,135,414 | 6/1964 | Lee | 220/235 |
| 3,144,162 | 8/1964 | Morris . | |
| 3,175,455 | 3/1965 | Reddy | 220/235 |
| 3,194,107 | 7/1965 | Ballard | 29/522.1 |
| 3,279,301 | 10/1966 | Fischer | 29/522.1 |
| 3,431,960 | 3/1969 | Neuschutz | 29/522.1 |
| 3,525,365 | 8/1970 | Meulendyk | 220/237 |
| 3,525,453 | 8/1970 | Lee | 220/233 |
| 3,825,146 | 7/1974 | Hirmann | 220/234 |
| 3,828,968 | 8/1974 | Kask . | |
| 3,895,466 | 7/1975 | Melton . | |
| 3,979,013 | 9/1976 | Schulte . | |
| 4,002,516 | 1/1977 | Gaborleau et al. . | |
| 4,034,462 | 7/1977 | Hentges | 29/522.1 |
| 4,083,468 | 4/1978 | Batchelor . | |
| 4,091,841 | 5/1978 | Beneker | 29/522.1 |
| 4,214,672 | 7/1980 | Peniche . | |
| 4,227,625 | 10/1980 | Underwood . | |
| 4,254,899 | 3/1981 | van Lit . | |
| 4,265,725 | 5/1981 | Tatum | 29/522.1 |
| 4,282,982 | 8/1981 | Nuesslein . | |
| 4,301,629 | 11/1981 | Farr . | |
| 4,425,943 | 1/1984 | Martin . | |
| 4,481,702 | 11/1984 | Mitchell | 29/522.1 |
| 4,925,578 | 10/1990 | Parent . | |

FOREIGN PATENT DOCUMENTS

| | | |
|---|---|---|
| 865957 | 3/1971 | Canada . |
| 829840 | 7/1949 | Fed. Rep. of Germany . |
| 1525720 | 11/1973 | Fed. Rep. of Germany . |
| 2230710 | 1/1974 | Fed. Rep. of Germany . |
| 7338267 | 4/1975 | Fed. Rep. of Germany . |
| 2457407 | 6/1976 | Fed. Rep. of Germany . |
| 2508269 | 9/1976 | Fed. Rep. of Germany . |
| 2632832 | 3/1977 | Fed. Rep. of Germany . |
| 2707337 | 9/1977 | Fed. Rep. of Germany . |
| 2632823 | 1/1978 | Fed. Rep. of Germany . |
| 2744501 | 4/1979 | Fed. Rep. of Germany . |
| 2854816 | 10/1981 | Fed. Rep. of Germany . |
| 3111241 | 9/1982 | Fed. Rep. of Germany ...... 220/237 |
| 3404187 | 2/1984 | Fed. Rep. of Germany . |
| 3308043 | 8/1984 | Fed. Rep. of Germany . |
| 3613133 | 9/1986 | Fed. Rep. of Germany . |
| 503923 | 2/1971 | Switzerland . |
| 506732 | 7/1971 | Switzerland . |
| 508828 | 7/1971 | Switzerland . |
| 1004429 | 9/1965 | United Kingdom ............ 29/522.1 |
| 1236338 | 6/1971 | United Kingdom . |
| 1530304 | 11/1976 | United Kingdom . |

Primary Examiner—Stephen Marcus
Assistant Examiner—S. Castellano
Attorney, Agent, or Firm—Antonelli, Terry, Stout & Kraus

[57] ABSTRACT

A method for sealing holes, involves fitting an essentially bushing- and/or tube-shaped plug into a hole and then the wall of the plug is expanded radially along at least one axial segment. In this method, the plug is positively anchored axially in the hole. By this method of producing an axially positive anchoring of the plug in the hole, not only is a tight fit of the plug in the hole achieved, but a mechanical movement of the plug relative to the hole is reliably prevented. A hole arrangement is tightly sealed with an essentially bushing- or tube-shaped plug in the hole having a radially spread axial part fitting tightly in the hole. Between the hole and the plug a locking arrangement with axially positive effect is provided. In a hole arrangement of this kind, not only is tightness ensured, but also piston-like displacement of the plug in the hole is prevented. The hole arrangement can preferably be so designed that the sealing and locking parts are provided axially at different points.

27 Claims, 11 Drawing Sheets

METHOD FOR TIGHT SEALING AND HOLE ARRANGEMENT

TECHNICAL FIELD

The present invention relates to a method of tight sealing of a hole, in which an essentially bushing-shaped or tubular plug is inserted into the hole, after which the wall of the plug is expanded radially along at least one axial segment to provide a tight seat for the plug in the hole, as well as a tightly sealed hole arrangement, in which an essentially bushing-shaped or tubular plug with a radially spread axial part fits tightly in the hole, as well as a hole and/or plug for the latter arrangement.

BACKGROUND ART

Procedures of this kind and corresponding hole arrangements are known. By radially expanding a plug, usually made of a metal such as steel, a hole seal is produced which is intended to withstand extremely high pressures, e.g., far above 1,000 bars. The design of such a hole arrangement and the corresponding method for sealing a hole by inserting the plug and expanding it are very simple and widespread. The technique on which the present invention is based specieswise is based on sealing techniques using rubber-elastic or otherwise elastic sealing elements, which rest or are pressed against the hole wall within the scope of their elasticity. These sealing techniques are complicated because of the provision of elastic sealing rings, and it is therefore not possible to achieve seals that can withstand pressures of the order of magnitude mentioned above or can only be achieved by the additional effort of providing a plurality of sealing points in line with one another. A sealing technique of this kind, with sealing rings specifically provided for the purpose, is known, for example, from GB-A-2 020 774, and also essentially from DE-OS 2 706 337 and DE-PS 3 308 043, in which the seal is produced by means of a sealing ring. It is also known to seal holes by welding sealing plugs in place, as proposed, for example, by DE-OS 2 632 823. Another technique for sealing a hole using a rubber-elastic element is known from GB-PS 1,530,304. Other sealing techniques are shown in the following:

U.S. Pat. Nos. 4,301,629, 4,295,578, 4,282,982, 4,254,899, 4,227,625, 4,214,672, 4,083,468, 4,002,516, 3,979,013, 3,895,466, 3,828,968, 3, 144,162, Can.Pat. 865957, DE-PS 563 474, DE-OS 3 404 187, DE-AS 1 525 720, DE-PS 829 840, DE-OS 3 613 133, DE-PS 2 854 816, DE-OS 2 230 710.

Methods for tight sealing as well as correspondingly sealed holes, in which a plug is deformed plastically to produce a tight seat in the hole, i.e., at least similar to the above species, are known, for example, from CH-PS 508 828, CH-PS 503 923, CH-PS 506 732, DE-OS 2 457 407, DE-OS 2 744 501, DE-OS 2 632 823, DE-OS 2 508 269, U.S. Pat. No. 4,436,117, and U.S. Pat. No. 4,425,943, DE-GM 7 338 267. Thus, DE-OS 2 508 269 describes a method in which a ball is pressed into a hole, after which the latter is caulked.

In others of these proposals, a plug or plug-like element made of a relatively hard material such as a metal, is spread radially to produce the tight seat. Then there is the problem that in this procedure, while the tightness of the seal may be ensured, one cannot reliably prevent, especially under high pressure loads, the sealing elements from shifting axially in the hole even though it provides a seal. This risk is all the more insidious because it cannot be detected by a pressure drop, but only when the sealing element, propelled by the high pressure in the hole, is shot out like a projectile.

DISCLOSURE OF INVENTION

The goal of the present invention is to solve this problem using a method or hole arrangement of the species outlined above.

This is accomplished in the method of the invention for tight sealing of a hole comprising forcing an essentially bushing- or tube-shaped plug into the hole and radially expanding the plug wall along at least one axial segment to produce a tight seal of the plug against the hole, wherein the plug is anchored positively and axially in the hole in order to prevent axial piston-like movement of the plug in the hole. The tightly sealed hole arrangement of the invention comprises as essentially bushing-shaped or tubular plug with a radially spread axial part fitting tightly in the hole for sealing the hole, and wherein a positively axially acting locking arrangement is provided between the hole and the plug, in order to provide a piston-like displacement of the plug in the hole, and wherein the sealing and the locking parts are provided axially at different points.

In providing an axially positive anchoring of the plug in the hole, the invention takes its departure from the fact that the plug may be able to provide a seal in the hole without reliably blocking its mechanical mobility relative to the hole. Pneumatic pistons could be mentioned in this connection. In the proposed technique, in which the seal is produced by virtue of the plasticity of the plug material, the problem is that, without tearing or breaking of the plug, it is not possible to have a spreadability as large as desired, but that even with relatively large plugs and hole tolerances, the possible spreading travel may be quite sufficient to produce a safe seal, but not simultaneously to prevent the mechanical displaceability of the plug in the hole.

The fact that the plug is anchored axially and positively in the hole means that the manufacturing tolerances for the plug and hole can be much more loose, since they need only meet the requirements of tightness. Positive anchoring in turn clearly does not have to meet the tightness requirements and can therefore be designed specifically for mechanical locking, which is less dependent on tolerance.

A first, very simple way of locking the plug axially in the hole comprises screwing the plug into the hole before the step of radially expanding.

Another possibility consists in providing a stop bearing for the plug, i.e., to insert the plug in the hole, spread it there to provide a seal, and then screw in, for example, a counterbearing plate into the hole above the plug, against which the plug rests with its end pointing out of the hole.

Another possibility is to expand a further axial segment of the plug for a positive anchoring radially into at least one recess in the hole wall, or by pressing the further axial segment into the hole wall. In this connection it is important to keep in mind that the plug in the hole must somehow be spread to provide a seal. This expansion process can also be used to provide the aforementioned positive anchoring in other words, simultaneously or sequentially to perform the sealing expansion and expansion of the plug wall into a recess in the hole wall so as to provide the positive anchoring or to force an anchoring part of the plug into the wall of the hole.

It is essential to keep in mind that, in order to produce the positive anchoring, it is not necessary to expel the plug material to produce tightness along the entire periphery of the plug, but deliberately to have only certain peripheral segments of the plug driven or bent outward, in order to engage the above mentioned recess or the hole wall, so that within the framework of material plasticity, much higher radial travels for mechanical locking are possible without disadvantageously affecting the integrity of the plug material.

In one form of the invention, at least one radially spring-tensioned part is provided on the plug, with the part snapping into a recess in the hole wall. Where such radially sprung parts are provided on the plug, when the plug is inserted into the hole, they are pushed in and slide along the wall of the hole and, at a preset height of the plug relative to the hole, engage suitably provided recesses in the hole wall.

Spring parts of this kind can of course be provided in several sections on the plug, for example, in the form of spherical locking surfaces forced outward by spring tension or by hooked locking surfaces, but for reasons of simplifying the design, it is preferable to slit the bushing-shaped plug wall axially in one end segment and thus produce radially spring-tensioned parts.

In order to increase safety in this way, and especially when using plug parts that are spreadable over a relatively large radial distance, or when using spring-tensioned elements on the plug, it is possible according to another feature of the invention, after producing the axial locking between the plug and the hole, to insert a counterbearing element into the plug, which prevents radial inward movement of the locking parts on the plug: the counterbearing element holds these parts in the hole wall recesses or in the hole wall or presses them thereinto.

Preferably, as is known in and of itself, and also in the procedure according to the invention, the plug is spread, to obtain the seal, but also according to the invention, the plug is spread to produce axial anchoring, by means of an expansion element driven into the plug. The expansion element can be a ball or a pin, for example.

If one considers that usually the expansion element remains in the plug, actually forms a part of the tightly sealed hole arrangement with the plug, and for all practical purposes acts as a counterbearing for the seal relative to the hole wall, it is evident that when it is not the plug directly but the expansion element in the hole that is to be protected against axial displacement, indirectly in this sense, the plug is also protected against such displacement, a pressure load acting out of the hole will then have a tendency to drive the plug against the expansion element anchored in the hole.

Where the axial anchoring of the plug is produced by anchoring the driven-in expansion element, a wide range of possible designs is offered, since there is now a different distribution of functions, in which the plug must be designed for tightness, the expansion element for expansion, and axial anchoring.

An extremely simple version is obtained by employing an expansion element which is driven into the plug by screwing. In this method and arrangement the expansion element is screwed into the hole already provided with the plug, a counterbearing is provided for the plug, and the screwing in of the expansion element simultaneously spreads the plug to obtain the seal, and the screwing-in action that drives the plug forward indirectly results in axial locking of the plug by means of the expansion element.

It may also be advantageous, according to another feature of the invention, to provide a suitable lubrication or pair of materials, e.g. between the expanding part of the expanding element and the plug, in its part to be expanded, to prevent the plug from turning as the expansion element is screwed in.

In order also to make the manufacturing tolerance as wide as possible for the plug and the expansion element, it is also proposed according to the invention to make the expansion element hollow on the inside or open on one side in the shape of a bell, and much wider than the bushing opening of the plug, so that the expansion element can be driven into the plug.

Another variation of the invention is to provide on the plug and preferably at least in the vicinity of the segment to be expanded for tightness, to force into the hole counterbearing surfaces, such as rings made integral with the plug, points, or bent rings, with a preferably axially perpendicular counterbearing surface or a counterbearing surface inclined relative to the sealing load on them, or to provide in a circular plug groove, for example, hardened spring rings with outer edges, and to force the latter into the softer wall material by spreading them to obtain axial anchoring.

Depending on the application, the proposed method is accomplished using an expansion element by forcing this element into the plug or by pulling it in. In the latter case, an opening is provided on the bushing-shaped plug, in the base, through which a pulling armature which can be broken off later and with an expansion element at the end is guided, and the latter is pulled into the plug.

Preferred hole arrangements and/or specific designs of the, hole and/or plug for such a hole arrangement are specified in more detail hereinafter and illustrated in the accompanying drawings.

BEST MODE FOR CARRYING OUT THE INVENTION

Figure 1:
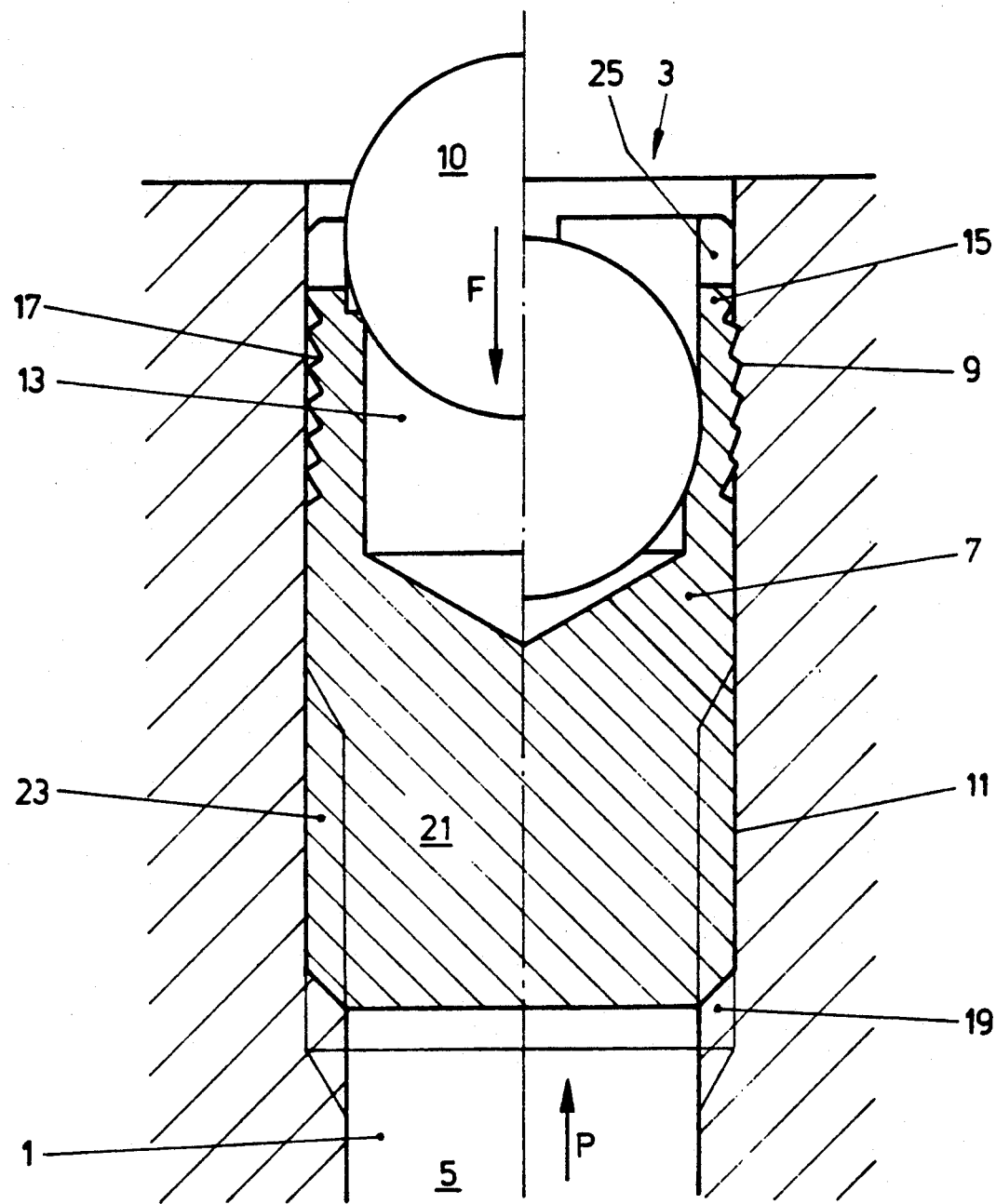
FIG. 1 is a lengthwise section through a first version of a hole arrangement according to the invention with a corresponding hole designed according to the invention and/or a plug designed according to the invention, whereby the plug is not spread on the left and is spread on the right, also for explaining the method according to the invention.

FIG. 1 shows a hole 1, to be sealed in sealing fashion, with an opening 3 to the environment and with a loading side 5. Into this hole 1, starting at the opening end, a one part plug 7 is inserted, in the manner to be described below, in order then to be spread at a sealing part 9 radially by plastic deformation of its material against the wall of hole 1, to obtain a tight fit. Then a locking arrangement 11 is provided which is anchored positively axially to hold plug 7 relative to hole 1.

These parts and/or functions provided in theory in all hole arrangements according to the invention and/or for all methods according to the invention, i.e., hole 1 with opening 3, loading side 5, plug 7, sealing part 9, and locking part 11 between the hole and the plug, are provided in all of the embodiments described hereinbelow, in one embodiment or another, and are therefore given the same reference numbers in the other embodiments.

In FIG. 1, plug 7 is made in the form of a bushing with a coaxial bushing opening 13. On the outside of bushing wall 15, an annular notch 17 is provided with a plurality of circular grooves arranged one behind the other and/or with shaped parts located therebetween and serrated in cross section. These notches 17 form sealing part 9 in this embodiment.

Locking part 11 comprises, on the one hand, at hole 1, at a distance from its opening 3, an inside thread 19 as a blocking surface and, at a part 21 of plug 7 abutting bushing opening 13, an outside thread 23 as a mechanical blocking part or portion of the plug. Plug 7 is also adapted to have an expansion element 10 inserted in the bush opening 13. The expansion element 10 is in the form of a ball, whose diameter is slightly larger than the inside diameter of bushing opening 13, especially at the level of sealing part 9.

Hole 1 as shown is sealed in sealing fashion as follows: first, plug 7 is screwed by its outside thread 23 into inside thread 19 in hole 1, whereby the axial lock between plug 7 and hole 1 is ensured, but not tightness. In this manner, plug 7 assumes the position shown at the left in this figure. Then expansion element 10, i.e., a ball in this case, is driven into bushing opening 13 in the direction marked F until it assumes the position shown at the right of this figure. As a result, notch 17 is forced into the material of the wall of hole 1, by plastic expansion of bushing wall 15 of plug 7 and appropriate plastic deformation of the hole wall material. As a result, tightness is ensured at sealing part 9 of the hole arrangement. To achieve this tightness, it is not necessary, as may be seen, for notch 17, as shown, to be forced completely into the wall material of the hole. It is merely sufficient to produce a much slighter radial driving in, in order to ensure tightness, in other words, a degree of expansion which differs according to the hole tolerances as well as the plug tolerances, and the materials used for the plug and the hole, and hence differs from one case to the other, without the tightness being negatively affected thereby. On the other hand, a tolerance-conditioned, slighter driving in, for example of notch 17 into the hole wall, would not ensure mechanical locking of plug 7 and hole 1 in such fashion that, with high loading pressures on loading side 5, for example much greater than 1,000 bars, possibly with mechanical vibrations of the arrangement, and/or pulsating pressures and/or temperature fluctuations, plug 7 could not with time shift in the direction of hole 3 and finally be expelled, if, separately from sealing part 9, a positive axial anchoring were not provided between the plug and the hole, as provided here by the axially engaged two threads 23 and 19.

It is clear that in order to screw plug 7 into hole 1, in its upper part, in wall 15 of bushing opening 13, for example, a slot 25 is provided for inserting a screwing tool.

It is clear that, instead of a thread between plug 7 and hole 1, a different design of axial lock can be provided, as, for example, a bayonet-connection-type lock, in which an axially arranged slot makes a transition to an azimuthally running slot part, for example, machined into the hole wall or into the outside wall of the plug, and in which, on the hole wall or the plug outside wall respectively, one or a plurality of radially projecting pin(s) is/are provided as the mechanical blocking part, which, as is known from similar bayonet connections, is/are first inserted axially along the axial slot and then turned azimuthally into the azimuthal slot part as a blocking surface of the hole wall.

Figure 2:
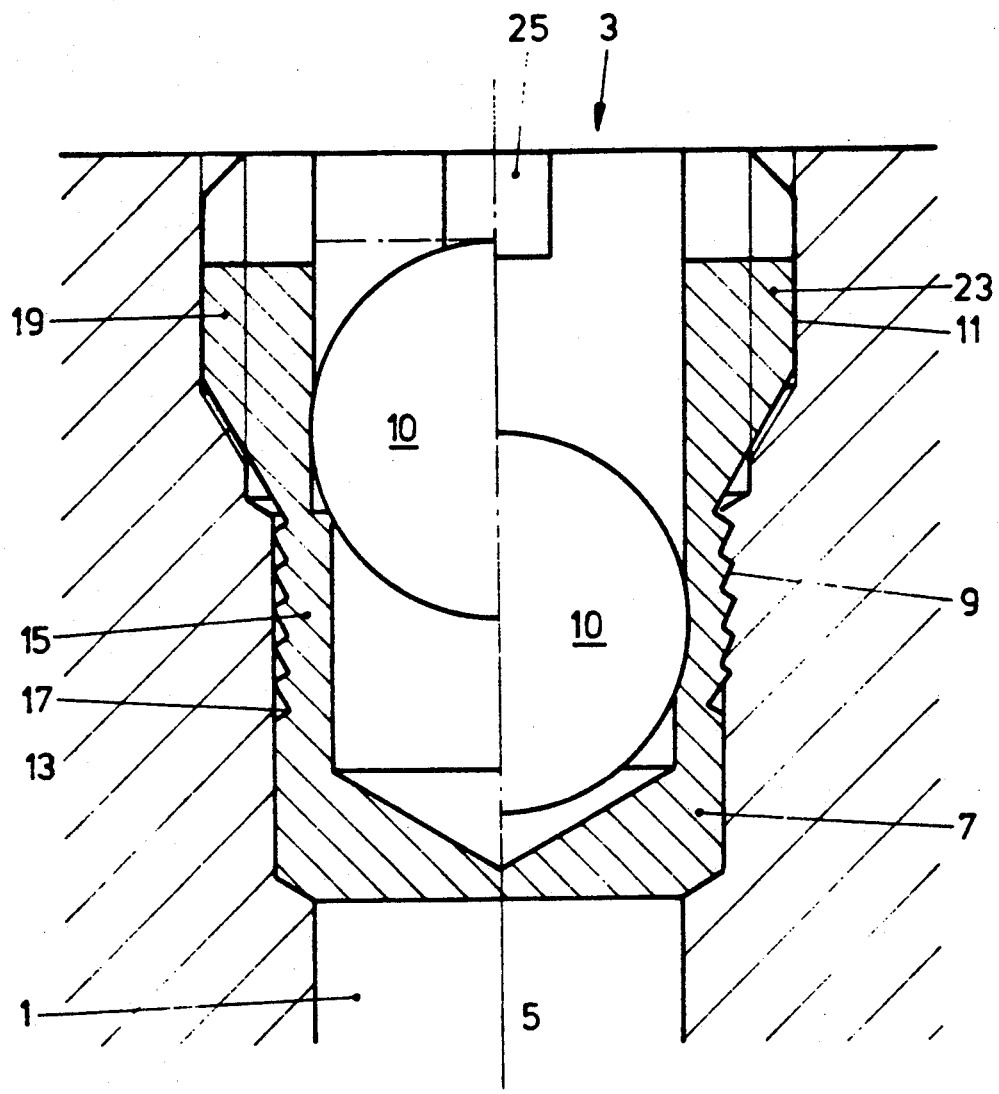
FIGS. 2 to 8 in representations analogous to those in FIG. 1 show further embodiments of the hole arrangement according to the invention and/or the hole designed according to the invention and/or the plug designed according to the invention.

The arrangement in FIG. 2 is theoretically of the same design as the one just described, with the difference that here bushing opening 13 extends practically over the entire length of plug 7. Here too, outer and inner threads 23 and 19 respectively are arranged above sealing part 9, relative to loading side 5 of hole 1, i.e., on plug 7 the outer thread forms a mechanical blocking part which is mounted on the outside of bushing wall 15. With respect to the creation of the seal according to the invention and its advantages by separating sealing part 9 and locking part 11, the remarks made referring to FIG. 1 apply.

In the embodiment according to FIG. 3, plug 7 is again designed over a large part of its axial extent in the shape of a bushing with bushing opening 13. Notch 17 on the outside of bushing wall 15 of plug 7 forms the projections on the plug side to produce tightness against sealing part 9. In the vicinity of opening 3 of hole 1 according to the invention an annular groove 27 is machined. This annular groove 27 forms the projection provided on the hole side to form locking part 11. Expansion element 10 is made here in the form of a pin with a spherical cap-shaped seal 28 and, pointing away from spherical cap 28, a coaxial frustroconical surface 30.

After plug 7, as shown at the left in the drawing, is simply inserted into hole 1, expansion element 10 is driven into bushing opening 13 of plug 7 in the direction F, so that in the manner described, by plastic deformation of the material of wall 15 as well as of the hole wall, notch 17, corresponding to the tolerance conditions, is driven into the wall and the tightness at sealing part 9 is ensured. When pin-shaped expansion element 10 is driven in the direction F, frustroconical surface 30 comes into the area of end part 15a of bushing wall 15. Then the axial extent of the plug, to the extent that an abutting shoulder 32 is preferably provided in hole 1, which preferably prevents plug 7 from sliding further into hole 1, is so dimensioned that end part 15a, which is to serve as a mechanical blocking part with plug 7 inserted, is at the height of annular groove 27. In this manner, the driving in of frustroconical surface 30 causes a radial outward spreading of this end part 15a and the latter grips behind annular groove 27. Hence, the locking at locking part 11 is produced on the one hand by the above-mentioned annular groove 27 and on the other hand by the spread bushing wall part 15a. Here also, locking part 11 is largely independent of the manufacturing tolerances of hole 1 and plug 7 and since, as explained above, creation of sealing only at sealing part 9 is likewise ensured within wide tolerance limits, here again the use of the plug as a whole is independent within wide limits of the manufacturing tolerances.

Figure 3:
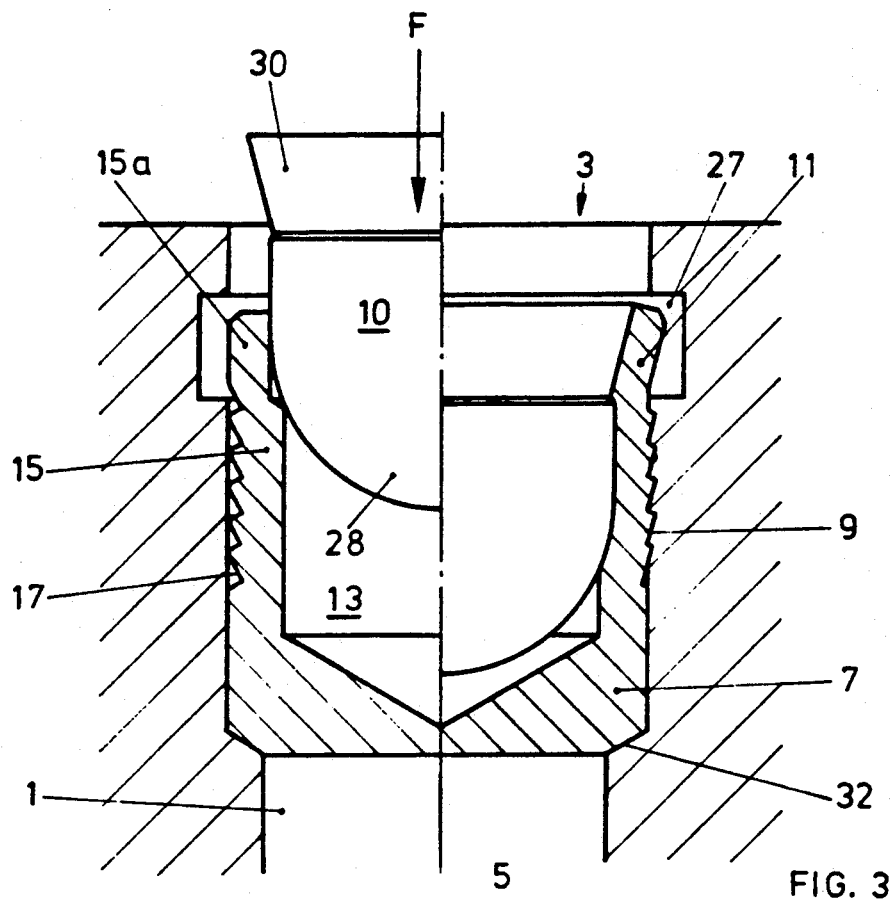
Figure 4:
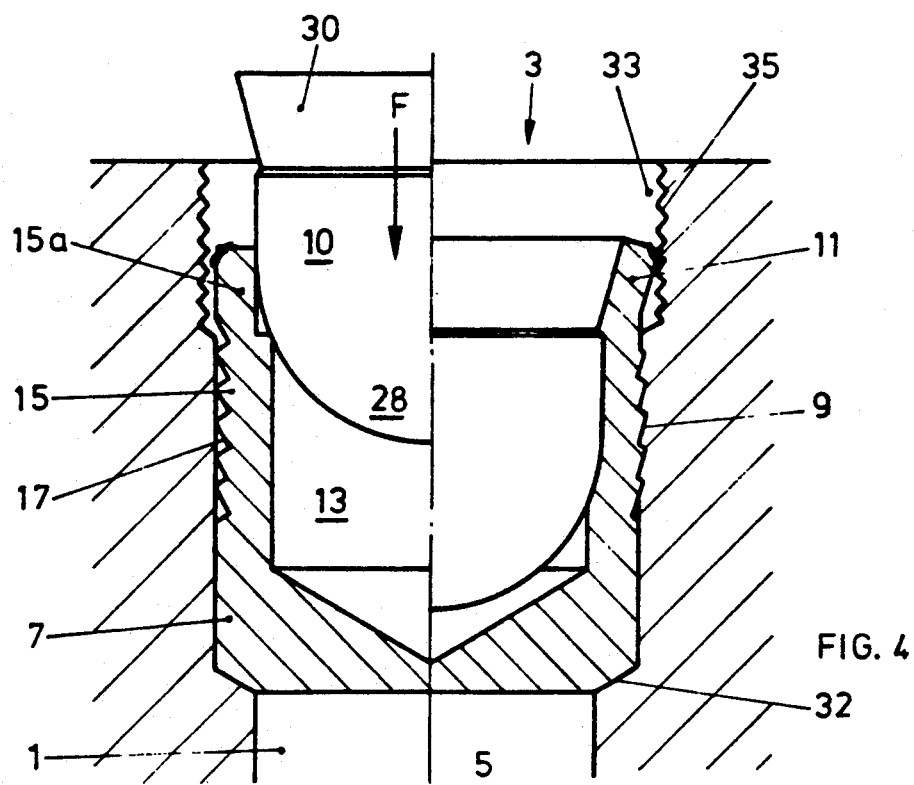

In contrast to the embodiment shown in FIG. 3, in which annular groove 27 has to be machined into the wall of hole 1 as part of locking arrangement 11, the embodiment according to FIG. 4 proposes expanding the diameter of the hole at the end, i.e., in a part 33 adjacent to opening 3. This part 33 of the hole with a slightly enlarged diameter has a roughened or shaped wall, and is preferably designed as a thread 35, which is easy to produce and is shown schematically in FIG. 4. When frustroconical surface 30 of expansion element 10 is driven in, the upper bushing wall part 15a of plug 7 as the mechanical blocking part of the plug is spread radially outward and forced into the profiled part and/or roughened part of part 33 of the hole.

Figure 5:
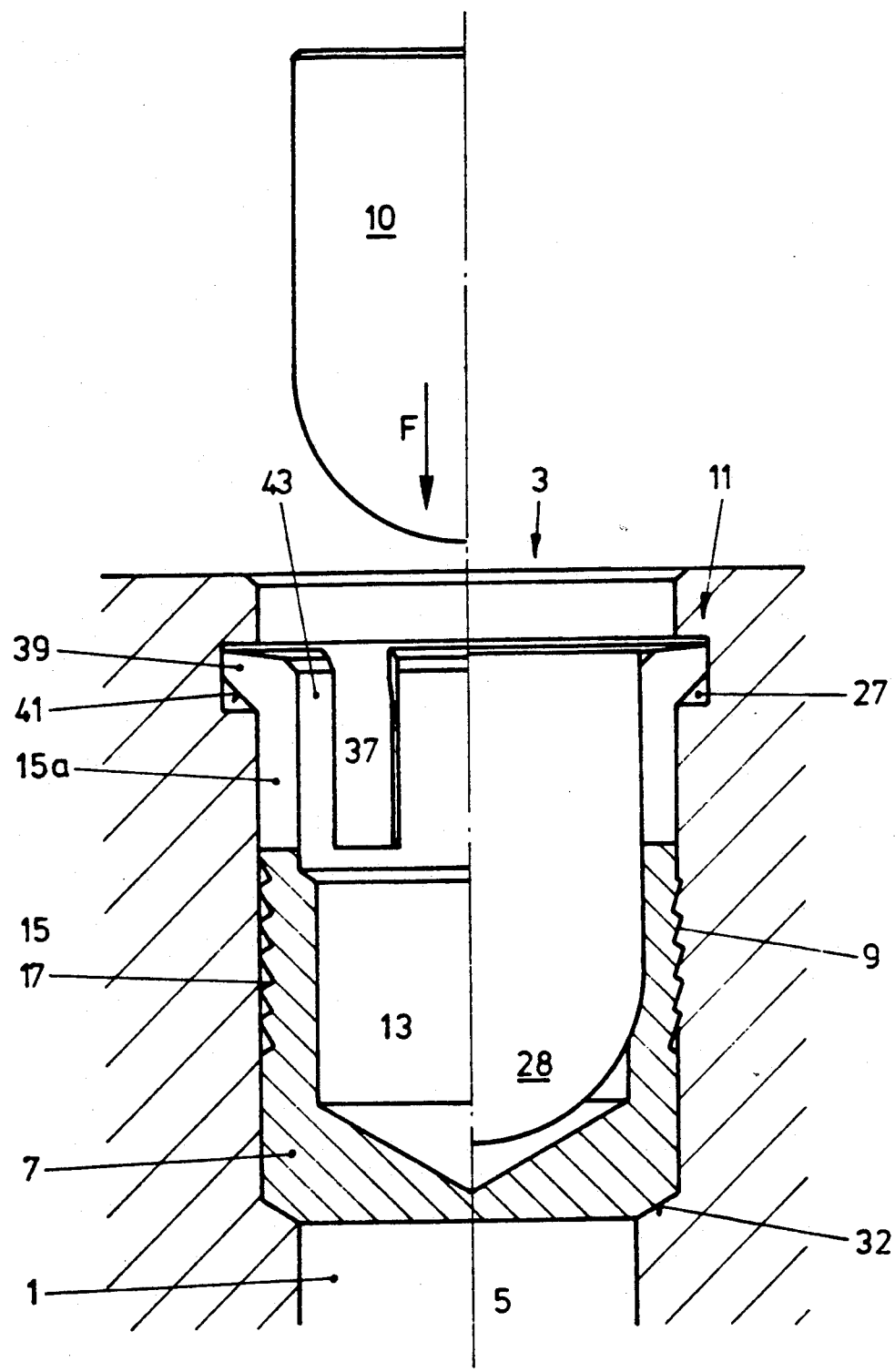

In FIG. 5, based on the embodiment shown in FIG. 3, another design is shown. Here upper bushing wall part 15a is slotted axially parallel, as shown at 37, with plug 7 being made crown-shaped at the side. The uppermost part of spring tongue 43 left between slots 37 has overhangs 39, with a frustroconical surface 41 as a guide surface. Expansion element 10, in turn, has no frustroconical surface 30, as shown in FIG. 3, but is cylindrical, with spherical cap 28 as a seal.

When plug 7 is inserted, spring tongues 43 formed between slots 37 are tensioned inwardly and radially under spring tension from overhangs 39 until plug 7 is brought into the position in which, resting on shoulder 32, spring tongues 43 with overhangs 39, as a mechanical blocking part of the plug snap into annular groove 27 of the wall of the hole. In this way, it is locked onto locking part 11, produced on the one hand by groove 27 and on the other hand by spring tongues 43 with overhangs 39. Then expansion element 10 is driven in and, in the manner described, drives notch 17 into the hole wall. At the same time, element 10 with its cylindrical segment provides a counterbearing for spring tongues 43, which are now not moved any further radially inward, but are held rigidly with their overhangs 39 in groove 27.

In the embodiment according to FIG. 6, hole 1, as already described with reference to FIGS. 3 to 5, is provided with annular groove 27. In contrast to the embodiment shown in FIG. 5, plug 7 here has no crown with spring tongues 43 but, as shown in FIG. 3, is designed as a bushing with notch 17. Here it is the expansion element 10 which has the crown structure, namely, it is formed like a bushing at its upper part, with slots 37a, so that spring tongues 43a, with overhangs 39a provided thereon, are formed. The lower part of plug 10 is preferably made of solid material. When expansion element 10 is driven in, spring tongues 43a snap into annular groove 27 by means of their overhangs 39a, so that locking 11 is produced here by positive engagement of parts of expansion element 10, namely, spring tongues 43a. Sealing shoulder 44 of upper wall part 15a on plug 7 acts as a mechanical blocking part of the plug which axially engages the groove 27 of the wall of the hole via the expander element. That is, the shoulder 44 is now also axially locked, resting on a supporting surface 45 of overhang 39a at expansion element 10. If necessary, here also, by analogy with FIG. 5, relative to spring tongues 43a, a counterbearing element can now be driven into the bushing at expansion element 10.

Figure 6:
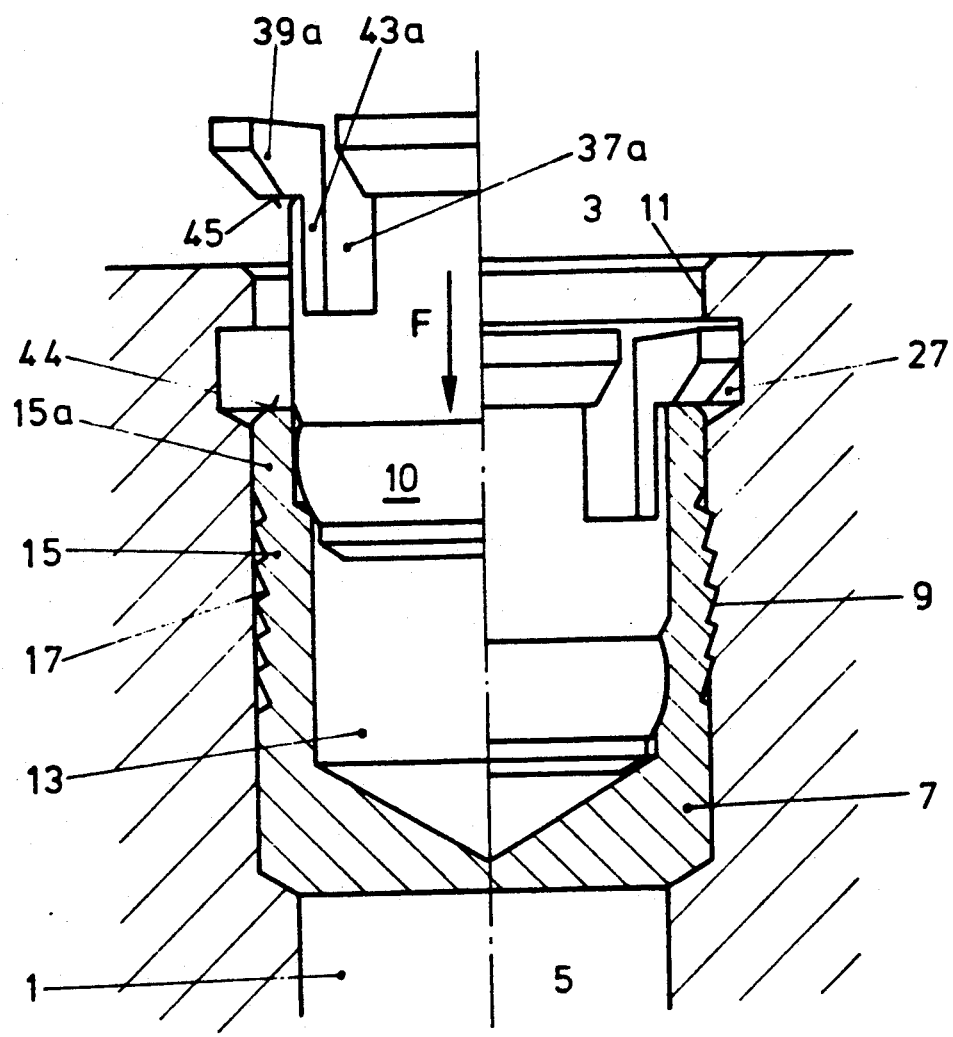
Figure 7:
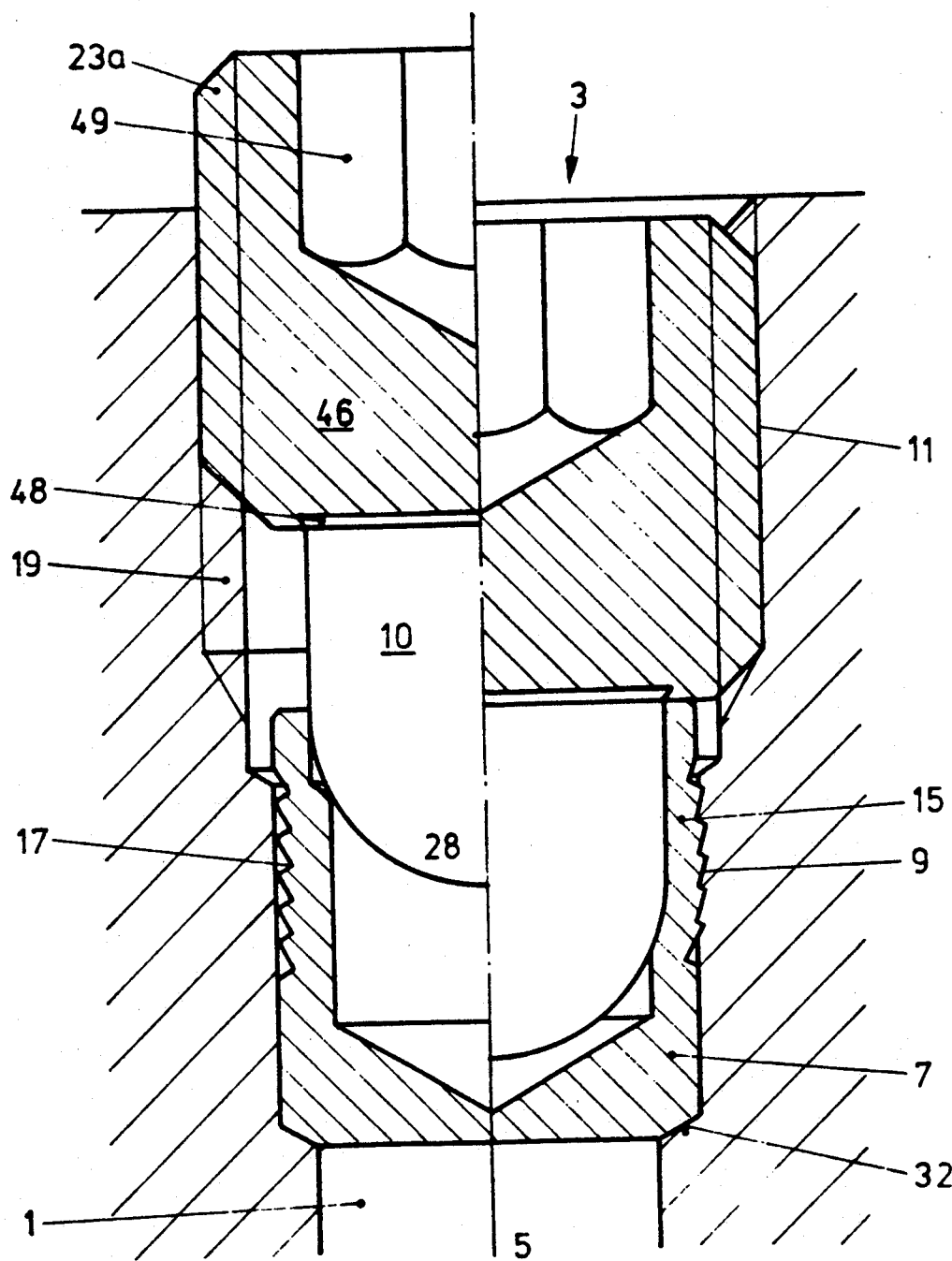

In the embodiment according to FIG. 7, plug 7 is designed in the same way as shown in FIG. 6, for example. As already described with reference to FIG. 2, here again, the upper segment of hole 1 has an inside thread 19. In contrast to the embodiment shown in FIG. 2, however, plug 7 does not have the matching outside thread, but expansion element 10 has its upper part 46 increased in diameter and it has an outside thread 23a there. The actual expanding part of element 10 is again cylindrical with spherical cap 28, preferably rotatably mounted on part 46 or abutting it, as shown at 48.

The sliding surface between the actual expansion part with spherical cap 28 and driving part 46 of expansion element 10 is preferably made of a pair of materials which ensures good sliding ability even under high pressure, such as Teflon or ceramic, or with a lubricant. By screwing, using a tool inserted into a matching recess 49, expansion element 10 is driven into the previously inserted plug 7 to produce tightness at part 9, whereby the inside and outside threads 19 and 23a respectively serve both for this driving forward and for the mechanical locking as locking part 11.

Figure 8:
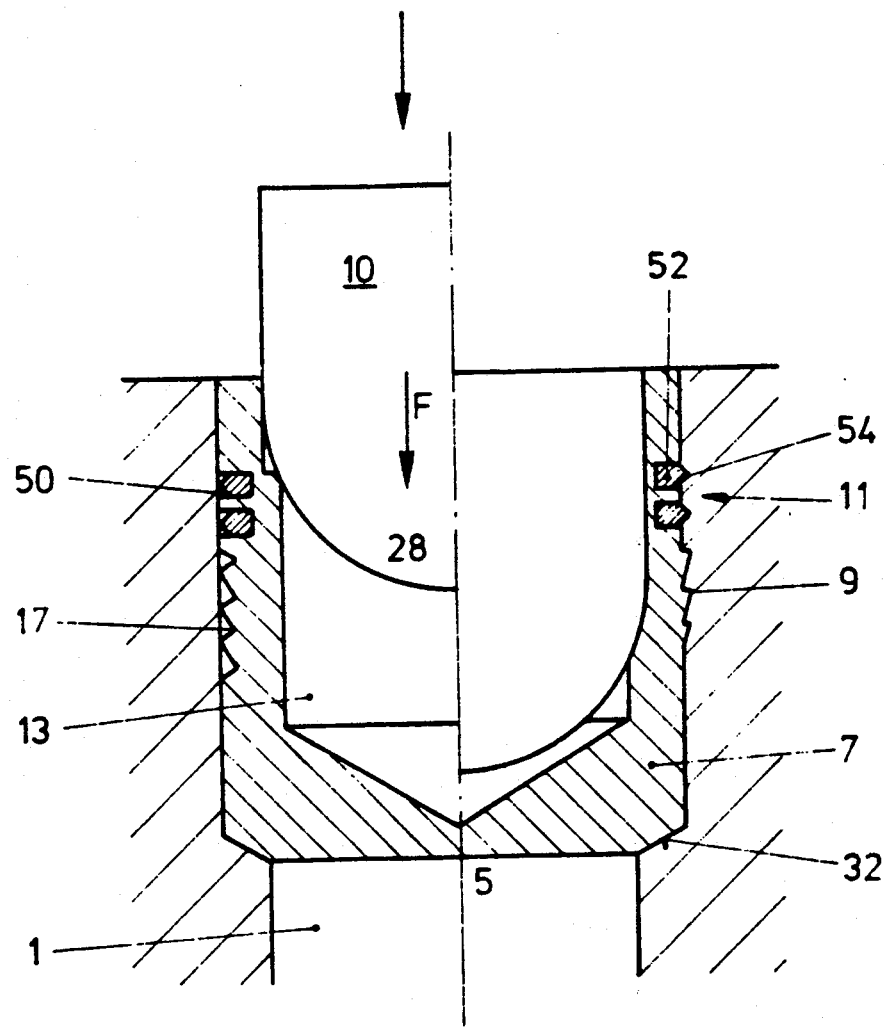

In the embodiment according to FIG. 8, plug 7 again is made in the form of a bushing with bushing opening 13, again has notch 17 for creating tightness at sealing part 9 as well as slotted and hardened cutting rings 52 recessed further into circular grooves 50. These rings, rotated radially outward, each have at least one sharp edge 54. When expansion element 10 is driven in, once again cylindrical with sealing spherical cap 28, at the same time that tightness is produced at sealing part 9, by plastic deformation of the plug wall part in the vicinity of circular grooves 50, the spring rings and/or their edges 54, as mentioned, made of hardened and hard material, are driven into the wall material of hole 1, whereupon mechanical axial locking at locking part 11 is ensured.

Instead of grooves with cutting rings, of course it is also possible to have hardened teeth permanently attached to the outside wall of plug 7 and distributed around its circumference, said teeth being driven into the wall of the hole when expansion element 10 is driven in. In addition, hardened projections of this kind in the form of an outside thread can be provided on plug 7, with a considerable thread pitch in such fashion that, as a result of axial driving forward of expansion element 10, by forcing this hardened steep-pitched thread into the hole wall material, plug 7 is rotated into its final position. Then the outside thread on plug 7 acts as a thread-cutting device with respect to the wall of the hole, whereby, as mentioned, preferably the drive is provided by means of the axially advanced expansion element, but in any case by rotating the latter.

Figure 9:
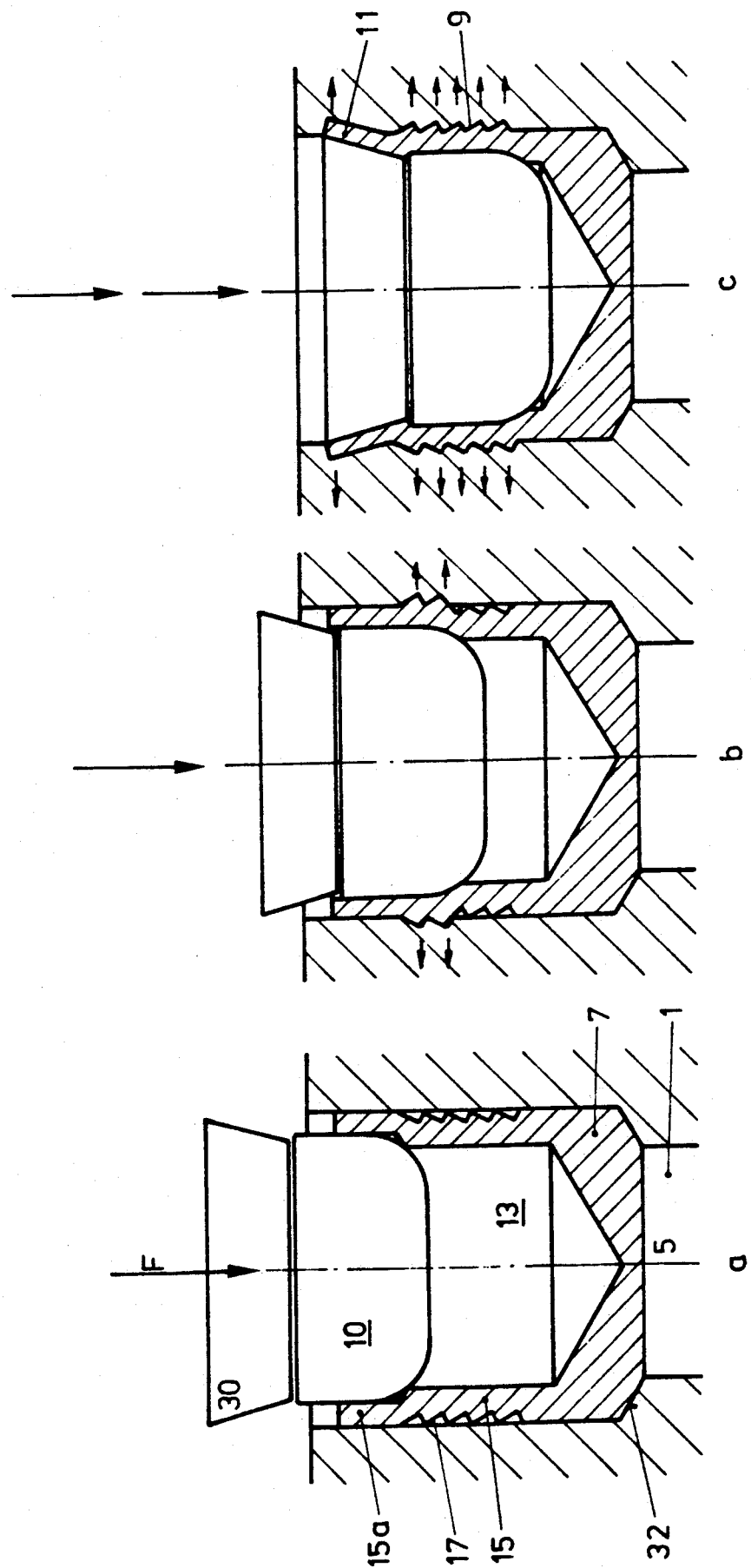
FIGS. 9a to c show, in lengthwise section a preferred hole arrangement according to the invention with an appropriately designed plug according to the invention, with the plug shown in successive stages of expansion.

FIG. 9 shows an embodiment preferred today for the drilling arrangement and/or the preparation of a tight seal according to the invention. It relies largely on the embodiment in FIG. 3. It was found to be disadvantageous to have the additional machining of annular groove 27 into hole wall 1. Similarly to the embodiment in FIG. 4, no annular groove 27 is machined into hole 1, but, as may be seen from the driving-forward procedure a to c in FIG. 9, sealing part 15a of bushing wall 15 of plug 7 designed as a sharp edge is driven with frustroconical surface 30 into the wall material of hole 1, producing a barb-like gripping of plug 7 in the wall material.

This embodiment has the advantage that no additional machining processes, as for example cutting threads or roughening according to FIG. 4, are required in the hole.

In all of the embodiments described thus far, when ensuring tightness at part 9, an expansion element 10 is driven from opening side 3 into plug 7. In certain applications, preferably this kind of expansion element is driven into the plug by applying tension from loading side 5. The following examples show embodiments of this kind.

Figure 10:
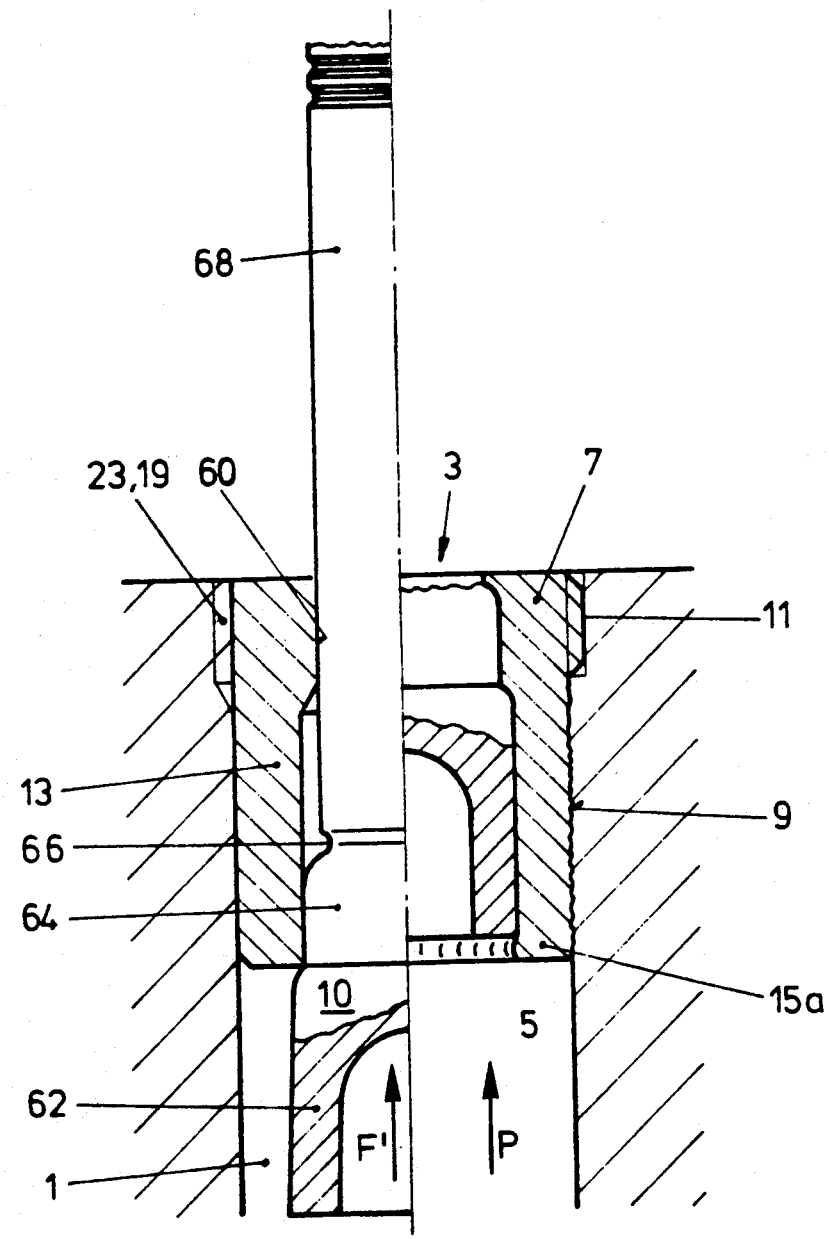
FIGS. 10 to 13, in a representation analogous to FIG. 1, show a hole arrangement according to the invention with a hole and/or plug designed according to the invention, in which, according to one version of the method according to the invention, the plug, by pulling an expansion element into the plug, is plastically deformed to produce the hole seal.

According to FIG. 10, plug 7, once again in the form of a bushing, is directed with its bushing sealing part 15a against loading side 5, and is inserted into hole 1. There, to form locking part 11 with a part with greater roughness, for example one with an outside thread 23, it is pushed into a corresponding part, likewise with increased roughness, for example with inside thread 19 of hole 1, so that it is pressed during the setting process or screwed in advance. In the bottom part of the bushing, plug 7 has a through opening 60. Expansion element 10 comprises a preferably frustroconical end expansion part 62, followed by a sealing part 64 with slightly smaller diameter for through hole 60, and next to that, with a breaking point 66, a pulling element 68. Pulling element 68 is guided through opening 60 and expansion element 10 is pulled into bushing 13 at plug 7 by pulling in direction F′, whereby its wall, possibly roughened, is pressed radially against the hole wall which may also be roughened to form sealing part 9. Locking part 11 is formed by the intermeshing of the two threads 19 and 23. After expansion element 10 has been driven in, pulling element 68 is broken off at breaking point 66. Especially in those embodiments in which the expansion element is pulled in, it may be desirable to make expansion part 62 hollow, in order to pull the expansion element into the bushing 13 of the plug with uniform cold deformation.

Figure 11:
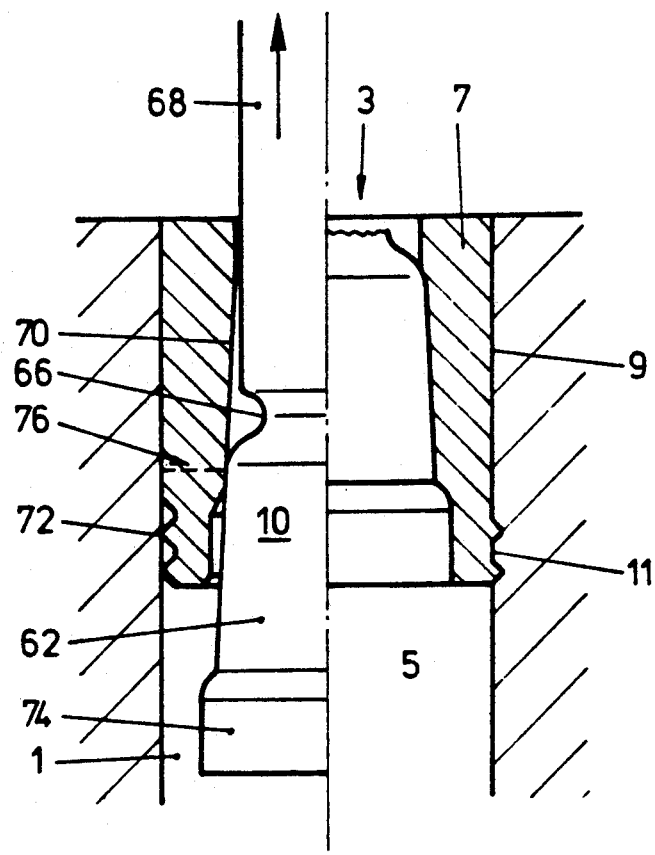

In the embodiment according to FIG. 11, plug 7 is largely made in the form of a tube stub with inside surface 70 which may taper conically. On the lower end of the plug 7, on its outside wall, serrations are provided, preferably in the form of annular ribs 72 with sharp edges, which are harder than the wall material of the hole. Expansion element 10 in turn has pulling element 68 with breaking point 66 followed by a frustroconically expanding expansion part proper 62, against which a larger-diameter driving part 74 abuts. When expansion element 10 is pulled in, frustroconical expansion part 62 enters the frustroconically tapering inside bore of plug 7 and presses at an axially expanded segment, the outside wall of plug 7 against the wall of hole 1, producing tightness in sealing area 9. However, a corresponding roughening of the outside surface of plug 7 and/or the inside wall of hole 1 is performed.

If the expansion element with its expansion part 62 is pulled all the way into plug 7, spreading part 74 is located in the lower part of inner surface 70 of plug 7 and, as a result of wedge action, has driven the hardened ribs 72, forming locking part 11, into the wall material. In this connection, it is preferred, as shown at 76, to slot the lower part of plug 7 with the hardened ribs, so that the possible spread of this part to form locking area 11 is considerably increased.

Figure 12:
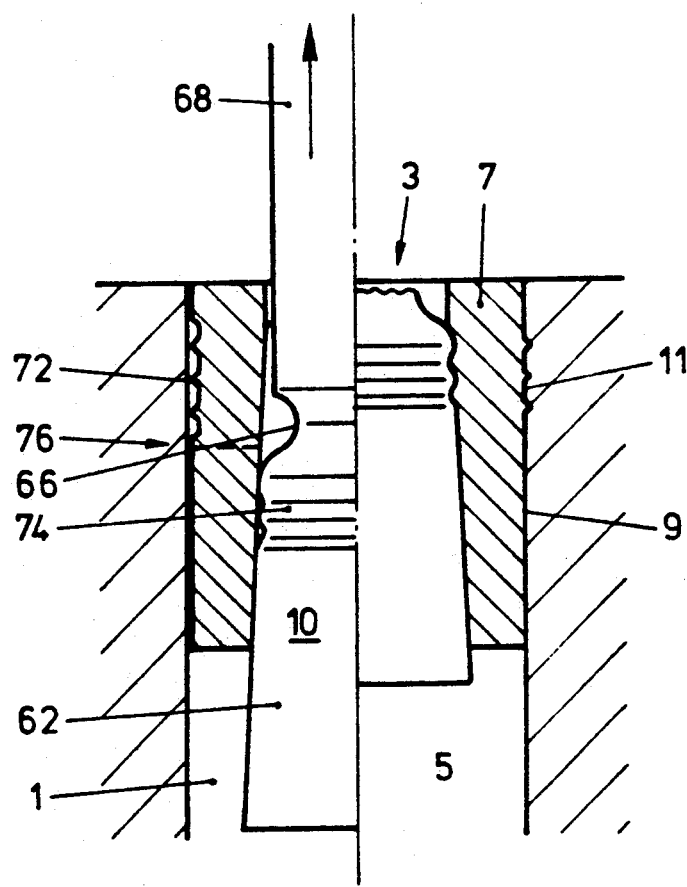

In contrast to the embodiment shown in FIG. 11, in the embodiment in FIG. 12 locking area 11 is formed at the opening side with ribs or projections 72 in an end part of plug 7, which is preferably also slotted at the opening, as shown at 76. Here again, the ribs or projections 72 are harder than the material of the hole wall. Accordingly, on expansion element 10 and adjacent to breaking point 66, spreading part 74 is located which, when expansion element 10 is pulled in, drives the hardened ribs into the wall material, followed by the expansion element proper 62, which presses the outside wall of plug 7 in sealing fashion against the wall of hole 1. The shape, preferably tapering like a wedge, of expansion element 10, as already described for the embodiment according to FIG. 10 and 11, causes the load on loading side 5 to drive the tight seal, tending increasingly to form more of a sealing action and increasingly to fit axially tighter in the hole.

Figure 13:
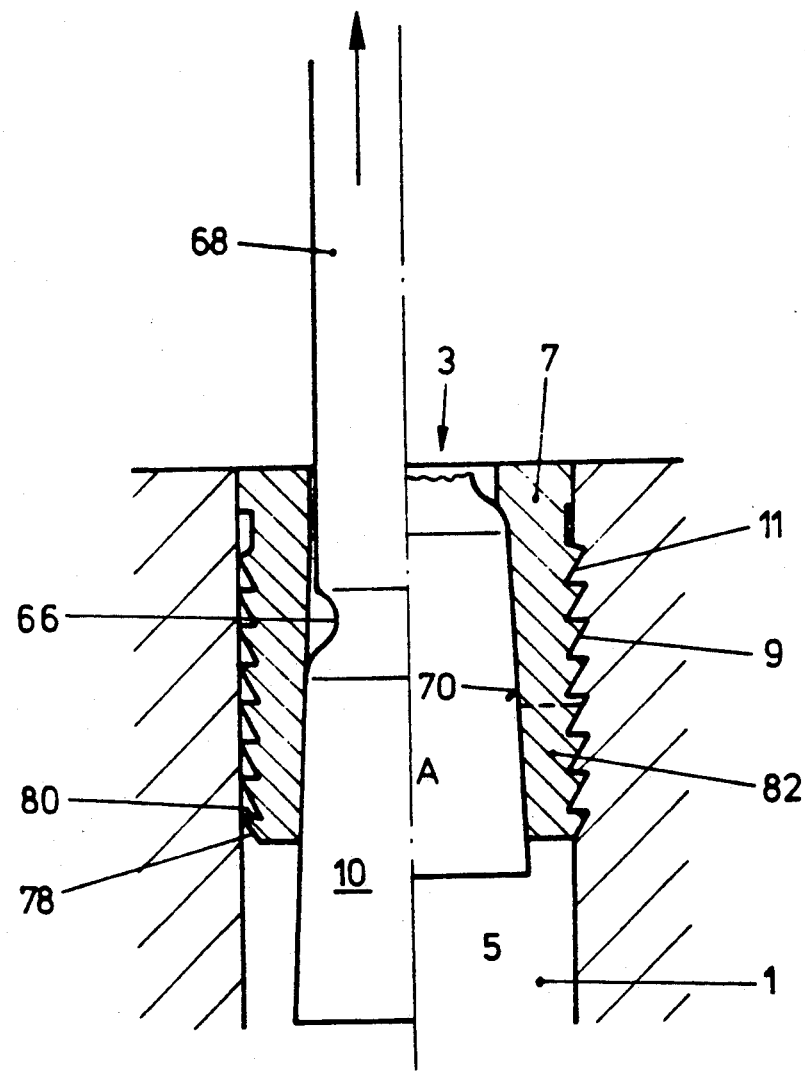

In the embodiment according to FIG. 13, plug 7 has the shape of a tube stub, preferably with inner surface 70 tapering frustroconically. On its outside wall it has a coaxial ring of teeth, with tooth flanks 78, which face the end of plug 7 with an expanded inside bore, i.e., loading side 5, inclined relative to the other plug end; the other two flanks 80 run perpendicular to mounting axis A or are inclined in the same direction as flanks 78. Tooth flanks 80 create counterbearing surfaces which, when expansion element 10 is driven in, engage like barbs in the wall material, while the tightness is ensured by flanks 78 of the teeth which face loading side 5. By this division of an annular tooth arrangement provided in tooth sealing flanks 78 and tooth locking flanks 80, a situation is again produced in which, even with the tolerance-related slight driving in of the teeth into the hole wall, secure mechanical retention of plug 7 in hole 1 is ensured; tightness in any case is ensured by slight engagement primarily by sealing flanks 78. To make spreading easier, slots 82 can also be provided in the lower part of plug 7, which then acts only as a mechanical lock.

I claim:

1. A method for tight sealing a hole using an expander element and a one part plug so as to sealingly and mechanically withstand high pressure from interior of said hole comprising the steps of
    forcing said one part plug off an essentially bushing- or tube-shape into said hole; and
    securing the plug in said hole so that it can sealingly and mechanically withstand high pressure from interior of said hole, said step of securing including expanding a sealing part of said one part plug radially by axially forcing said expander element into an axial bore of said one part plug to sealingly engage the wall of said hole substantially by radial pressure of an external wall portion of said sealing part, and axially engaging a mechanical blocking part of said one part plug on a portion of said wall disposed substantially radially and facing said interior of said hole at least one of directly and of via said expander element.

2. The method of claim 1, comprising axially engaging said mechanical blocking part of said one part plug by screwing said plug into said hole before expanding said sealing part of said one part plug.

3. The method of claim 1, wherein said mechanical blocking part comprises an axial segment of said one part plug, said axially engaging step including radially forcing said axial segment of the plug into one of at least one recess within said wall of said hole and of directly into said wall.

4. The method of claim 3, said radial forcing of said axial segment of said one part plug and said expanding of said sealing part of said one part plug being performed by said expander element.

5. The method of claim 1, said mechanical blocking part of said one part plug comprising at least one radially spring-like part, said axial engaging of said mechanical blocking part being performed by snapping said at least one spring-like part of said one part plug into a recess within said wall for mechanically blocking said one part plug.

6. The method of claim 5, wherein said expander element acts as a counterbearing for said spring-like part to radially block it within said recess in said wall of said hole.

7. The method of claim 1, wherein said expander element comprises at least one radially spring-like movable part which is snapped into a recess in said wall of said hole and thus axially blocked, said one part plug is further axially engaged on a blocking surface of said expander element.

8. The method of claim 1, wherein said expander element is driven into said plug by screwing.

9. The method of claim 1, wherein said expander element is screwed into said hole, and is thus driven into said one part plug for sealingly engaging said sealing part of said one part plug by substantially radial pressure onto said wall, and wherein said expander element is mechanically and axially blocked by said screwing-in, said mechanical blocking part of said one part plug being axially engaged to said expander element.

10. The method of claim 9, wherein transmission of a rotary motion from said expander element to said plug is prevented.

11. The method of claim 1, wherein said expander element is provided with a coaxial hollow space.

12. The method of claim 1, wherein said expander element is one of pulled into or pushed into said one part plug.

13. The method according to claim 1, wherein said expanding and said axially engaging secure the plug in the hole so that it can sealingly and mechanically withstand pressure above 1,000 bars from interior of said hole.

14. A tightly sealed hole arrangement comprising a hole with a wall, one side of which being loadable by a high pressure, the other side of which abutting in a surrounding of substantially lower pressure, consisting essentially of an essentially bushing- or tubular-shaped one part plug residing within said hole;

an expander element urged into an axial bore within said plug;

a sealing portion of said one part plug being sealingly urged substantially radially onto the wall of said hole;

at least one mechanical blocking portion of said one part plug being axially arrested on at least one blocking surface of said wall, facing substantially in axial direction towards said one side of said hole, said mechanical blocking portion of said one part plug being arrested on said at least one blocking surface of said wall one of directly and of via said expander element.

15. The arrangement of claim 14, wherein said at least one blocking surface of said wall is provided towards said other side of said hole.

16. The hole arrangement according to claim 14, wherein said at least one blocking surface of said wall is formed by a threaded part of said hole.

17. The arrangement of claim 16, wherein said expander is screwed into said threaded part.

18. The arrangement of claim 14, wherein said hole comprises at least one radial recess in said wall forming said at least one blocking surface of said wall.

19. The arrangement of claim 18, wherein said plug comprises at least one radial expandable spring-like portion within said recess.

20. The arrangement of claim 18, said expander element comprising at least one radially expandable spring-like portion within said recess.

21. The arrangement of claim 14, said one part plug comprising a first part being sealingly urged onto said wall of said hole by said expander element, said mechanical blocking portion of said one part plug comprising at least one area of said one part plug radially spread into said wall, said at least one blocking surface of said wall being formed by previous urging of said area of said wall.

22. The arrangement of claim 21, wherein said expander element radially counterbears said portions of said one part plug.

23. The arrangement of claim 14, said one part plug having a coaxial bore, said expander element comprising a pulling element projecting through said bore and being driven into said bore of said one part plug by pulling from said other side of said hole.

24. The arrangement of claim 14, wherein at least one radial projection is provided on said one part plug, said projection being made of a material harder than the material of said one part plug and harder than the material of said wall, said projection being driven into said wall by said expander element and forming said blocking portion of said one part plug.

25. The arrangement of claim 14, said one part plug comprising two segments with teeth comprising flanks disposed towards said other side of said hole and flanks disposed towards said one side of said hole, said teeth being urged by said expander means into said wall of said hole, said sealing portion comprising said flanks of said teeth disposed towards said one side of said hole, said mechanical blocking portion of said one part plug being formed by said flanks disposed towards said other side of said hole.

26. The arrangement of claim 14, said expander element having a central cavity and being cold-drawn into said one part plug.

27. The arrangement of claim 14, wherein said plug is secured in the hole so that it can sealingly and mechanically withstand pressures above 1,000 bars from interior of said hole.

* * * * *

UNITED STATES PATENT AND TRADEMARK OFFICE
CERTIFICATE OF CORRECTION

PATENT NO. : 5,078,294
DATED : January 7, 1992
INVENTOR(S) : W. Staubli

It is certified that error appears in the above-identified patent and that said Letters Patent is hereby corrected as shown below:

Column 10,
Line 38, delete "off" and insert -- of --.

Signed and Sealed this

Twenty-fourth Day of May, 2005

JON W. DUDAS
*Director of the United States Patent and Trademark Office*